US012763356B2

(12) United States Patent
Cho

(10) Patent No.: US 12,763,356 B2
(45) Date of Patent: Oct. 13, 2026

(54) AUTOMATIC MATERIAL SUPPLY DEVICE FOR SECONDARY BATTERIES

(71) Applicant: FITO Co., Ltd., Asan-si (KR)

(72) Inventor: Ji Hoon Cho, Cheonan-si (KR)

(73) Assignee: FITO Co., Ltd., Asan-si (KR)

( * ) Notice: Subject to any disclaimer, the term of this patent is extended or adjusted under 35 U.S.C. 154(b) by 0 days.

(21) Appl. No.: 18/896,503

(22) Filed: Sep. 25, 2024

(65) Prior Publication Data

US 2026/0088327 A1 Mar. 26, 2026

(51) Int. Cl.
*H01M 10/04* (2006.01)
*B65H 19/18* (2006.01)

(52) U.S. Cl.
CPC .... *H01M 10/0409* (2013.01); *B65H 19/1884* (2013.01); *B65H 2801/72* (2013.01)

(58) Field of Classification Search
CPC .............. H01M 10/04; H01M 10/0409; B65H 19/1884; B65H 2801/72
See application file for complete search history.

(56) References Cited

U.S. PATENT DOCUMENTS

2022/0274798 A1* 9/2022 Ahn .................. B65H 19/1852
2023/0123540 A1* 4/2023 Cao ..................... B65H 19/286 242/532.3
2024/0243330 A1* 7/2024 Lee ..................... B65H 19/123
2024/0322213 A1* 9/2024 Lee ..................... B65H 19/102

FOREIGN PATENT DOCUMENTS

KR 10-0819183 B1 4/2008

* cited by examiner

*Primary Examiner* — Sang K Kim

(57) ABSTRACT

Provided is an automatic material supply device for a secondary battery. The device includes a material supply reel configured to enable a wound material for the secondary battery to be loaded, a material pulling part configured to pick up an end of a newly wound material for the secondary battery loaded on the material supply reel, and configured to pull the material a predetermined distance, and a material transfer part configured to hold a side of the material pulled out by the material pulling part and configured to pull the fixed material to a material connector. The automatic material supply device for the secondary battery is advantageous in that it is possible to automate a preparing process for replacement after loading a secondary battery material into a loading position.

12 Claims, 14 Drawing Sheets

AUTOMATIC MATERIAL SUPPLY DEVICE FOR SECONDARY BATTERIES

BACKGROUND

Field

The present disclosure relates to an automatic material supply device for a secondary battery and, more particularly, to a device that automatically supplies a wound material to a position for withdrawal and connection.

Related Art

A tape attachment device for a secondary battery is equipment used in a secondary battery production process to attach tape to both sides of the secondary battery and continuously supply it. The tape attachment device for the secondary battery requires an automated process to precisely adjust the position of tape, provide stable attaching force, and increase productivity.

Regarding such a tape attachment device for the secondary battery, Korean Patent No. 819183 is disclosed. However, despite the automatic attachment function of the device, it requires a process where a worker has to manually place and wait for a new material.

SUMMARY

The present disclosure provides an automatic material supply device for a secondary battery to solve the problem of low efficiency due to the manual supply of a material in a conventional secondary battery manufacturing device.

In an aspect, an automatic material supply device for a secondary battery is provided. The device may include a material supply reel configured to enable a wound material for the secondary battery to be loaded, a material pulling part configured to pick up an end of a newly wound material for the secondary battery loaded on the material supply reel and configured to pull the material a predetermined distance, and a material transfer part configured to fix a side of the material pulled out by the material pulling part, and configured to pull the fixed material to a material connector.

The material pulling part may include a first pulling part configured to hold and move an outer excess of the wound material for the secondary battery, and a second pulling part configured to hold a portion of the material pulled out by the first pulling part and transfer it to the material transfer part.

The first pulling part may further include a first interference avoidance part configured to cause the first pulling part to be removed from a transfer path of the material when the second pulling part holds the material.

The second pulling part may further include a second interference avoidance part configured to cause the second pulling part to be removed from the transfer path of the material after the material is delivered to the material transfer part.

Each of the first interference avoidance part and the second interference avoidance part may be configured to be movable in a direction orthogonal to a transfer direction of the material.

The material pulling part may further include a first horizontal movement part configured to reciprocate the first pulling part along a first distance, and a second horizontal movement part configured to reciprocate the second pulling part along a second distance.

The second distance may be determined to be longer than the first distance.

The material transfer part may include a rotary driving part configured to change a direction of the material received from the second pulling part.

The material transfer part may further include a third interference avoidance part that delivers the material to the material connector and then moves it to prevent interference.

The material supply reel and the first pulling part each may be configured as a pair, and may be symmetrical about an x-axis with the material transfer part as a center.

The material transfer part may be configured to transfer the material above a height at which a previous material is fixed to the material connector.

The automatic material supply device may further include a frame formed to extend in a vertical direction and configured so that the material supply reel, the material pulling part, the material transfer part, and the material connector may be fixed.

The material supply reel, the material pulling part, the material transfer part, and the material connector may be configured to transfer the material from a front of the frame.

The first interference avoidance part, the second interference avoidance part, and the third interference avoidance part may be configured to be movable to the front or rear of the frame.

Advantageous Effects

According to an aspect of the present disclosure, an automatic material supply device for a secondary battery is advantageous in that it is possible to automate a preparing process for replacement after loading a secondary battery material into a loading position.

DESCRIPTION OF EXEMPLARY EMBODIMENTS

Figure 1:
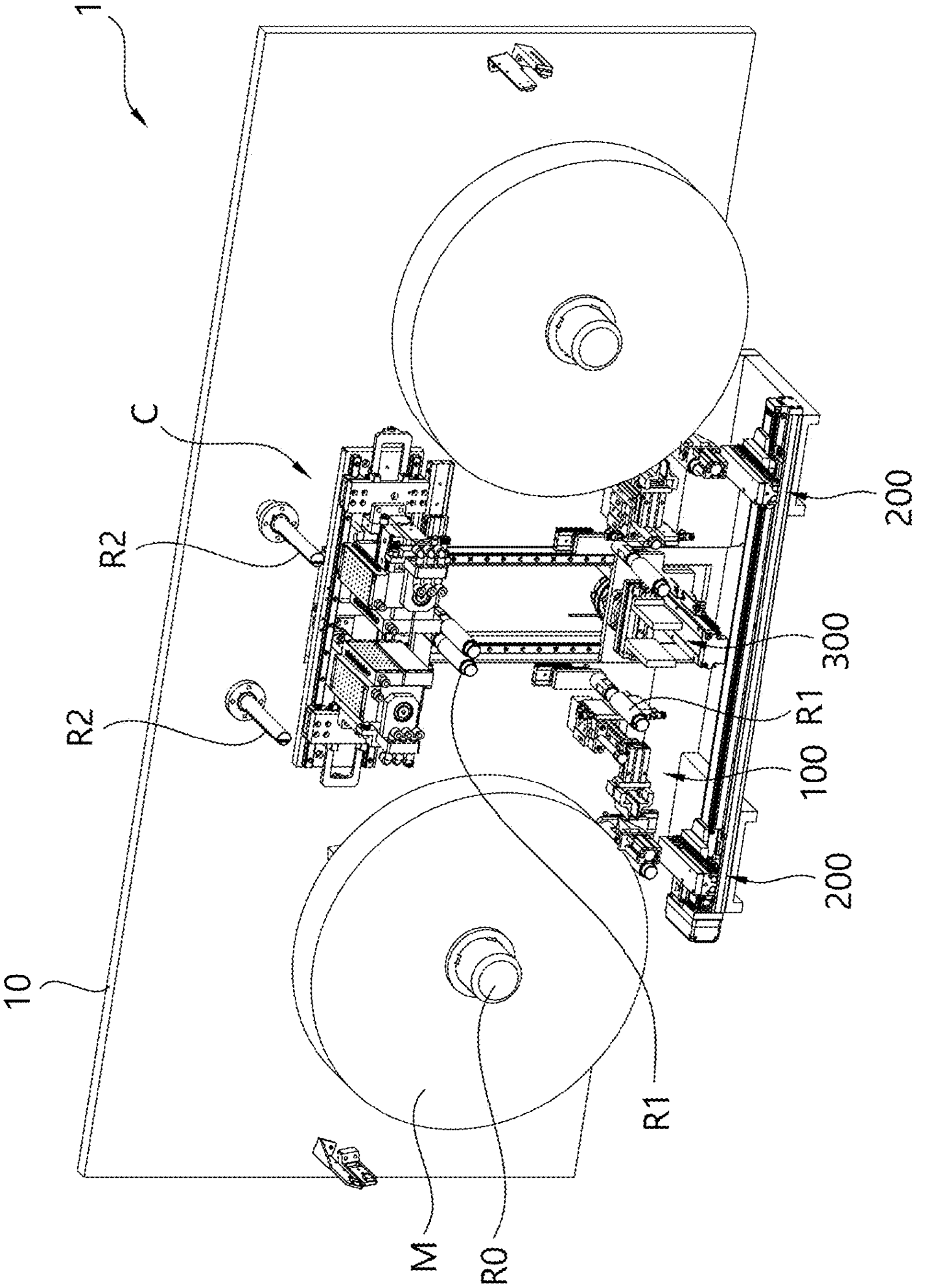
FIG. 1 is a perspective view illustrating an automatic material supply device for a secondary battery according to an embodiment of the present disclosure.

Hereinafter, an automatic material supply device for a secondary battery according to an embodiment of the present disclosure will be described in detail with reference to the accompanying drawings. In the description of the following embodiment, the names of components may be referred to by different names in the art. However, if they have functional similarity and identity, they can be seen as having an equivalent configuration even if a modification is adopted. Further, reference numerals are added to the components for the convenience of description. However, the description of the drawings to which the reference numerals are added does not limit each component to the scope within the drawings. Likewise, even if some modifications are adopted, it can be seen as an equivalent configuration if there is functional similarity and identity. When it is recognized by those skilled in the art that a component is essential, an explanation thereof will be omitted.

In the present disclosure, a material for a secondary battery refers to a material that is produced in a predetermined length and supplied in a wound form and that becomes one element of the secondary battery. As an example, the material for the secondary battery may become an electrode.

On the other hand, in the present disclosure, the material may be supplied in a rolled shape. At this time, the outermost portion of the material may have a material end, and the end may be provided with a component, such as a tab, which allows the end of the material to be easily detached.

Figure 2:
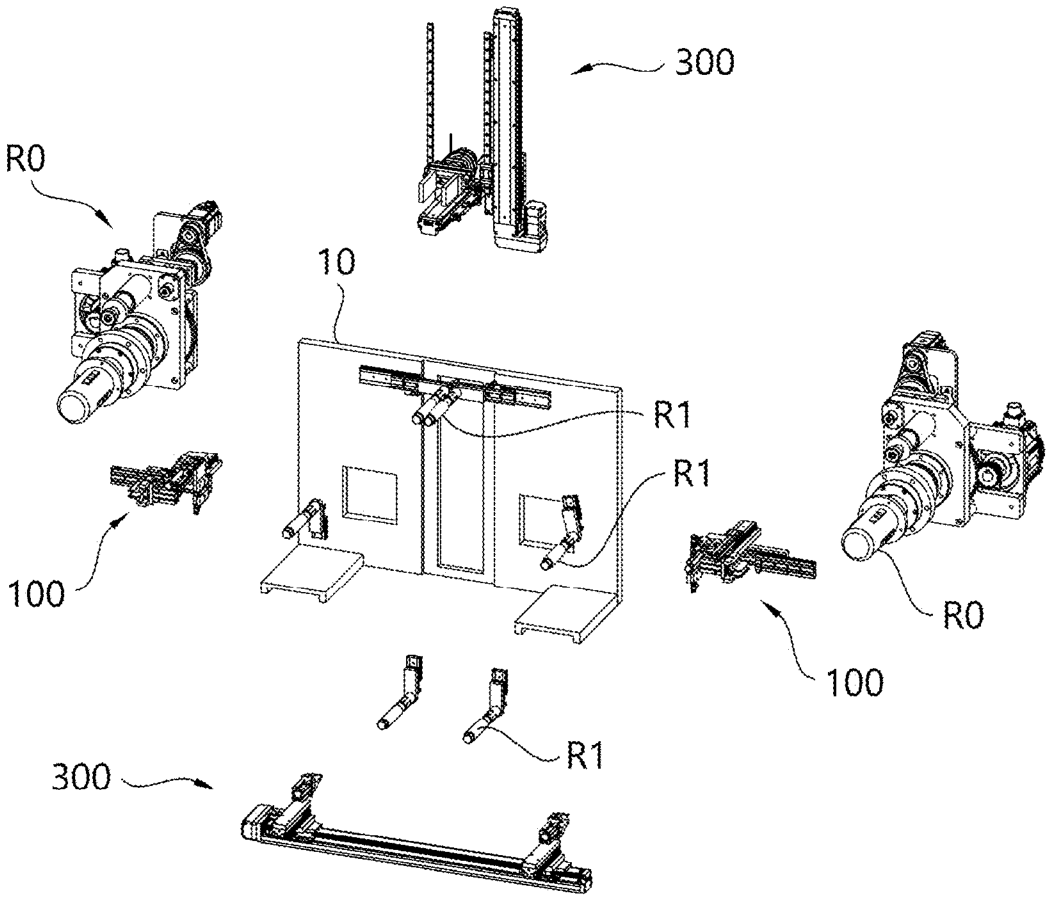
FIG. 2 is an exploded perspective view illustrating an automatic material supply device for a secondary battery according to an embodiment of the present disclosure.

FIG. 1 is a perspective view illustrating an automatic material supply device for a secondary battery according to an embodiment of the present disclosure, and FIG. 2 is an exploded perspective view illustrating an automatic material supply device for a secondary battery according to an embodiment of the present disclosure.

Referring to FIGS. 1 and 2, the automatic material supply device 1 for the secondary battery according to an embodiment of the present disclosure may include a frame 10, a material supply reel Ro, a material pulling part, and a material transfer part 300.

It may be configured to have various elements of a secondary battery manufacturing device. The frame 10 may be formed to have a predetermined area in a vertical direction. Further, the frame 10 serves as a base on which components to be described later may be provided. In the following, the frame 10 extends along the xz plane, and the "front" and "rear" are distinguished based on the frame 10.

The material supply reel Ro may be configured to place a material M thereon. The material supply reel Ro may be formed on the frame 10 to extend forward to a predetermined length. A servo motor may be provided on a side of the supply reel of the material M. The servo motor may control a rotating speed to maintain a constant linear speed of the material M that is taken out depending on the amount of the material M used.

The material pulling part is configured to pull out a new material M by holding an end thereof and pulling it to a predetermined length. The material pulling part may include a first pulling part 100 and a second pulling part 200. In the present disclosure, the material pulling part is described separately in terms of the function of initially firmly holding the end of the material M due to the characteristics of the rolled material M and the function of transferring it for placement. That is, in the present disclosure, the main purpose of the first pulling part 100 is to precisely and accurately hold the material M, and the second pulling part 200 may be configured to receive the material M from the first pulling part 100 and to enable the first pulling part 100 to pull a long distance for a next operation.

The first pulling part 100 is configured to hold the end of a newly supplied material M and pull it out a predetermined distance. The first pulling part 100 is configured to hold an outer end of the rolled material M. For example, it is configured to directly hold the end of the material M or to hold a component such as a "tab" attached to the end.

The first pulling part 100 moves horizontally to pull out the material M a predetermined distance while holding the tab.

The second pulling part 200 is configured to hold and pull the material M that is pulled out a predetermined length by the first pulling part 100. The first pulling part 100 may be horizontally moved past the second pulling part 200 so that the second pulling part 200 may hold the material M instead of the tab.

A clamp of the first pulling part 100 may be provided so that an end thereof may face the material M. Meanwhile, a clamp of the second pulling part 200 may be formed in the width direction of the material M. After transferring the material M to the second pulling part 200, the first pulling part 100 releases the tab and moves away from a transfer path of the material M. Thus, when the second pulling part 200 holds and pulls the material M, interference by the first pulling part 100 can be prevented.

A moving guide roller R1 may be provided on a path along which the second pulling part 200 moves. The moving guide roller R1 may be configured to be movable on the frame 10. Therefore, when the second pulling part 200 moves horizontally, the moving guide roller R1 may be moved, for example, in a z-axis direction to avoid interference with the second pulling part 200. Subsequently, before the material M is held and pulled by the material transfer part 300, the moving guide roller R1 returns to its original position to properly support the material M.

A third pulling part may receive the material M from the second pulling part 200 and move to a position where the material M is to be fixed. The third pulling part may include a clamp that is rotatably configured to change the transfer direction of the material M.

In the present disclosure, the material supply reel Ro, the first pulling part 100, the second pulling part 200, and the moving guide roller R1 each may be configured as a pair, and may be configured to be symmetrical about an x-axis with the material transfer part 300 as a center.

Thus, the material M may be alternately supplied from the left or right, and the secondary battery manufacturing device may operate continuously.

Meanwhile, in the present disclosure, a pair of second pulling parts 200 may share a horizontal guide with each other. However, the second pulling parts 200 may alternately operate while preventing collision with each other.

In the present disclosure, the automatic material supply device 1 for the secondary battery may include the moving guide roller R1. The moving guide roller R1 may be adjusted in position on the frame 10 to prevent interference with the movement of the second pulling part 200 and the material transfer part 300. Further, the position may be adjusted to determine the appropriate transfer path of the material M when the material M is delivered to a material connector C. Furthermore, it may include a material fixing roller R2 to place the material M supplied to the material connector C thereon. The material fixing roller R2 may be configured as a pair so that materials supplied from each material supply roller R0 may be placed thereon.

Figure 3:
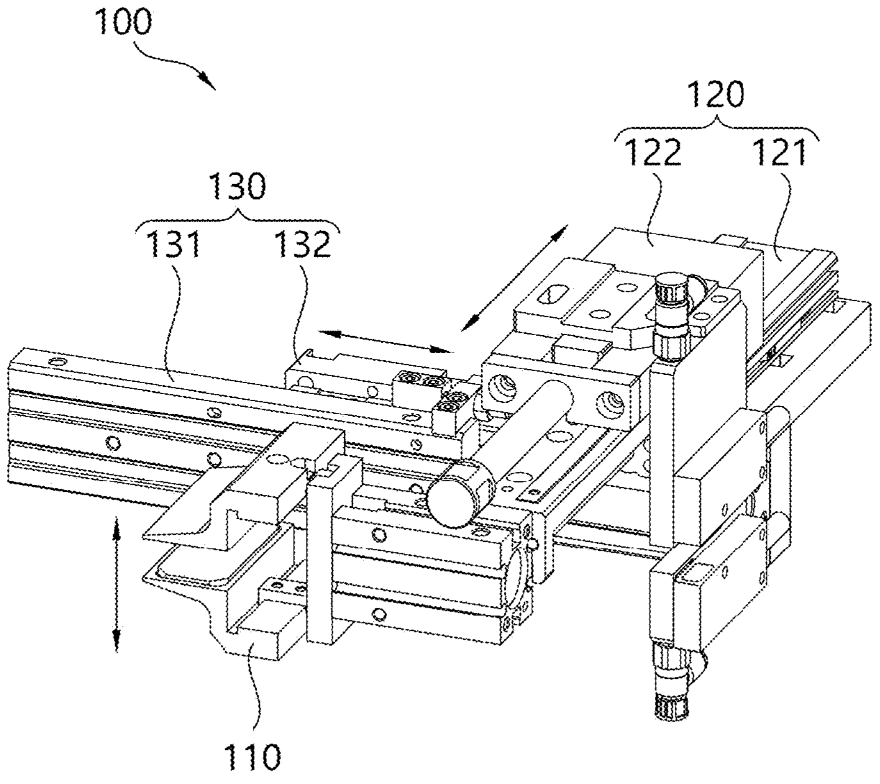
FIG. 3 is an operational state diagram of a first pulling part in an embodiment of the present disclosure.

FIG. 3 is an operational state diagram of the first pulling part 100 in an embodiment of the present disclosure.

Referring to FIG. 3, the first pulling part 100 may include a first clamp 110, a first interference avoidance part 120, and a first horizontal movement part 130.

The first clamp 110 is configured to hold the tab. The first clamp 110 may be configured to prevent damage to the material M during the process of clamping the tab. A width of the first clamp 110 may be configured to have a similar width corresponding to the width of the material M to be clamped.

The first interference avoidance part 120 may be provided to move the first clamp 110 out of the transfer path of the material M. The first interference avoidance part 120 may be operated after the first pulling part 100 delivers the material to the second pulling part 200 that will be described later. The first interference avoidance part 120 is configured to move the first clamp 110 forward or backward a predetermined distance. The first interference avoidance part 120 may include a first y-axis guide 121 configured in the y-axis direction, and a first y-axis driving part 122 moving the first clamp 110 in the y-axis direction. Although the present disclosure describes that the first interference avoidance part 120 moves to the rear side of the frame 10 as an example, this is only an example and the avoidance direction may be configured in various ways.

The first horizontal movement part 130 is configured to pull out the material M to a predetermined length in a direction away from the material supply reel Ro when the first clamp 110 holds the tab. The first horizontal movement part 130 may include a first x-axis guide 131 that is secured at a side thereof to the frame 10, and a first x-axis driving part that is configured to be movable in the x-axis direction on the first x-axis guide 131.

Figure 4:
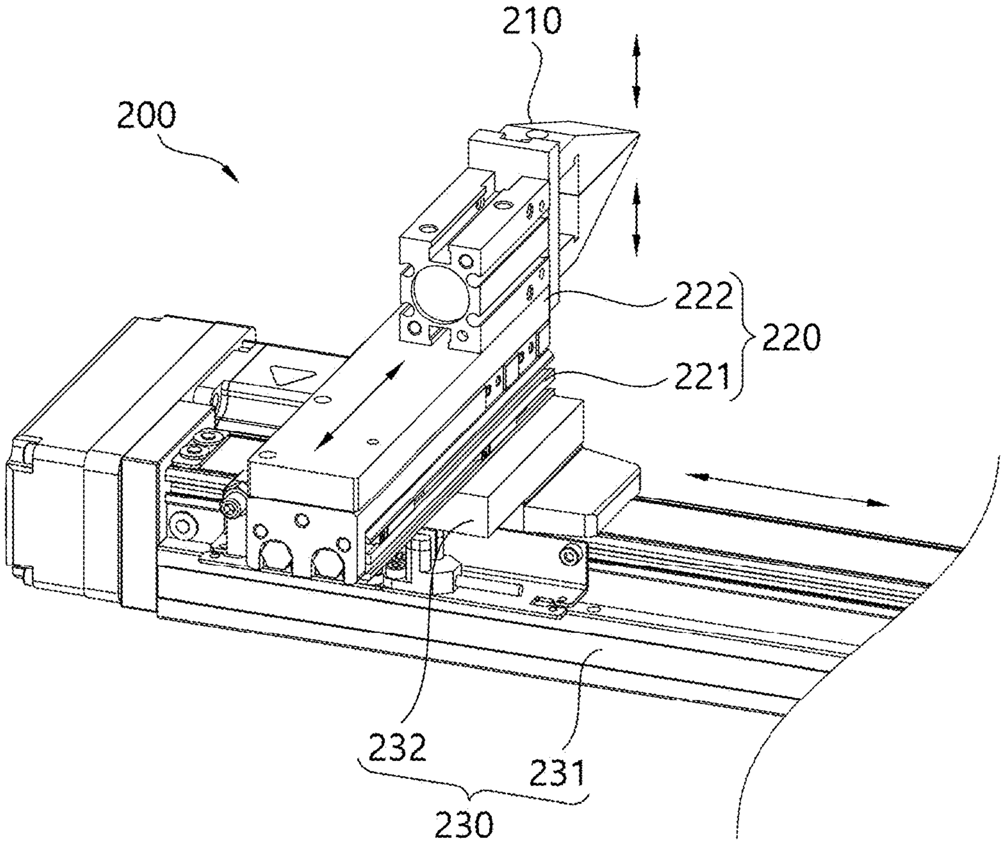
FIG. 4 is an operational state diagram of a second pulling part in an embodiment of the present disclosure.

FIG. 4 is an operational state diagram of the second pulling part 200 in an embodiment of the present disclosure.

Referring to FIG. 4, the second pulling part 200 is configured to pull out the held material M to a predetermined length. The second pulling part 200 may include a second clamp 210, a second interference avoidance part 220, and a second horizontal movement part 230.

The second clamp 210 is configured to clamp the material M when the material M is pulled out to a predetermined length by the first pulling part 100. At this time, the second clamp 210 may be positioned between the first clamp 110 holding the tab and the material supply reel Ro.

The second clamp 210 may be configured in the form of a pair of tongs. The second clamp 210 is configured so that an opening may be formed in the y-axis direction.

The second interference avoidance part 220 is configured to move to a position for holding the material M with the second clamp 210. It may also be configured to avoid interference by moving the second clamp 210 in an opposite direction.

The second interference avoidance part 220 may include a second y-axis guide 221. The second y-axis driving part 222 may adjust the position of the second clamp 210 while moving along the second y-axis guide 221. As an example, the second y-axis guide 221 may be configured to move the second clamp 210 forward from the transfer path of the material M.

The second horizontal movement part 230 may be configured to move horizontally on the second x-axis guide 231. The second x-axis guide 231 may be provided to extend to a predetermined length between the pair of material supply reels Ro, and may be coupled at a side thereof to the frame 10.

The second horizontal movement part 230 may be configured to adjust the horizontal position of the second interference avoidance part 220. The position of the second clamp 210 in the x-axis direction may be finally adjusted by the operation of the second horizontal movement part 230. The second horizontal movement part may include a second x-axis guide 231 and a second x-axis driving part 232 configured to be movable along the second x-axis guide in the x-axis direction.

Figure 5:
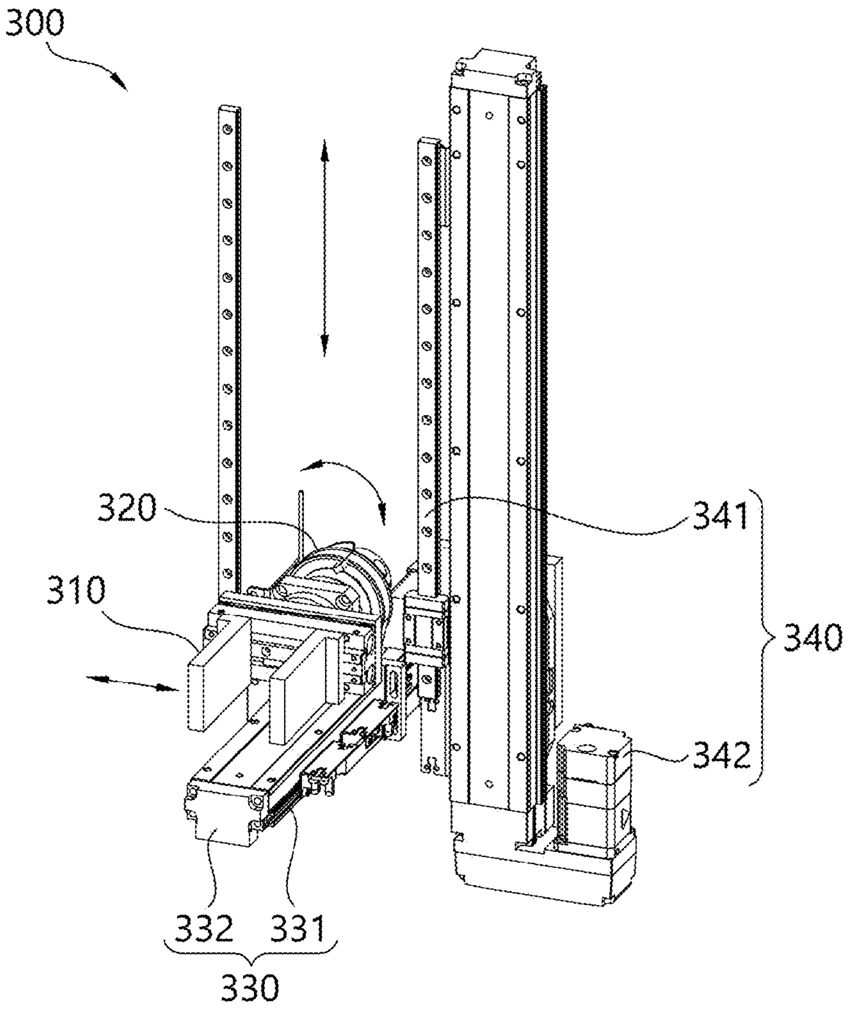
FIG. 5 is an operational state diagram of a material transfer part in an embodiment of the present disclosure.

FIG. 5 is an operational state diagram of the material transfer part 300 in an embodiment of the present disclosure.

Referring to FIG. 5, the material transfer part 300 is configured to receive the material M pulled out by the second pulling part 200 and to transfer the end of the material M to a required position in the secondary battery manufacturing device. A position where a new material M is required may be the material connector C connecting the old material M and the new material M.

The material transfer part 300 may include a third clamp 310, a rotary driving part 320, a third interference avoidance part 330, and a vertical position adjusting part 340.

The third clamp 310 is configured to hold the material M. The third clamp 310 may perform a clamping operation by the separately provided driving part.

The rotary driving part 320 is configured to rotate the third clamp 310 around an axis in the y-axis direction. For instance, the rotary driving part is configured so that the direction of the material M may be changed in a direction perpendicular to a direction in which the material M is pulled from the second pulling part 200.

The third interference avoidance part 330 is configured to move the third clamp 310 and the rotary driving part 320 to the outside of the transfer path of the material M after the material M is delivered to the material connector C. The third interference avoidance part 330 may include a third y-axis guide 331 and a third y-axis driving part 332.

The vertical position adjusting part 340 may include a z-axis guide 341 and a z-axis driving part 342.

The z-axis guide 341 may be provided on the frame 10, and the third clamp 310 may extend to a position for supplying the material M to the material connector C. The z-axis driving part 342 is configured to adjust the vertical position of the third interference avoidance part 330 on the z-axis guide 341. Finally, the vertical position of the third clamp 310 may be adjusted by the operation of the z-axis driving part 342.

At this time, the position of the moving guide roller R1 may be adjusted by a roller position adjustment part that is provided on a side of the frame 10. At least one moving guide roller R1 may move upward when the second pulling part 200 pulls the material M, and may move downward to support the material M when the material M is pulled by the material transfer part 300.

Figure 6:
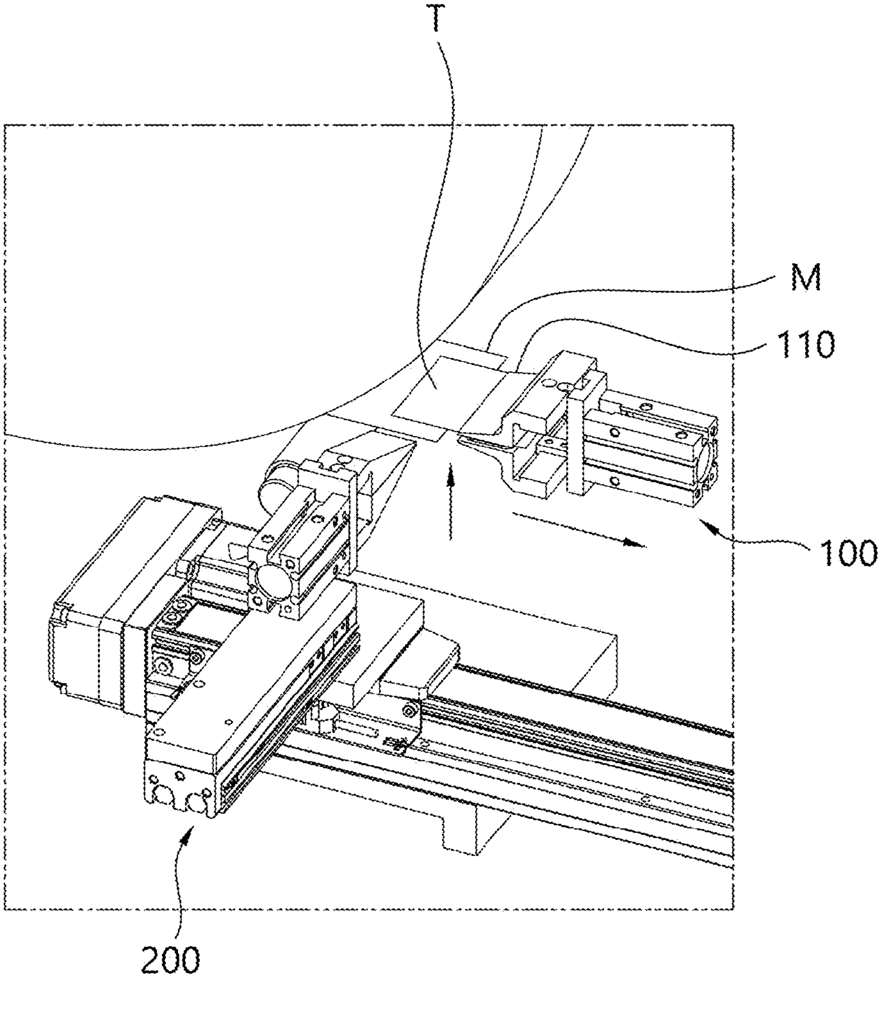
FIG. 6 is a usage state diagram of the first pulling part in an embodiment of the present disclosure.

FIG. 6 is a usage state diagram of the first pulling part 100 in an embodiment of the present disclosure.

Referring to FIG. 6, the first pulling part 100 may move pullard the material supply reel Ro while the first clamp 110 is opened, and may move horizontally until the tab enters the first clamp 110.

The first pulling part 100 may be moved back (to the right in FIG. 6) a predetermined distance while holding the tab T of the material M with the first clamp 110.

At this time, the second pulling part 200 moves forward so as not to interfere with the horizontal movement of the first pulling part 100.

Figure 7A:
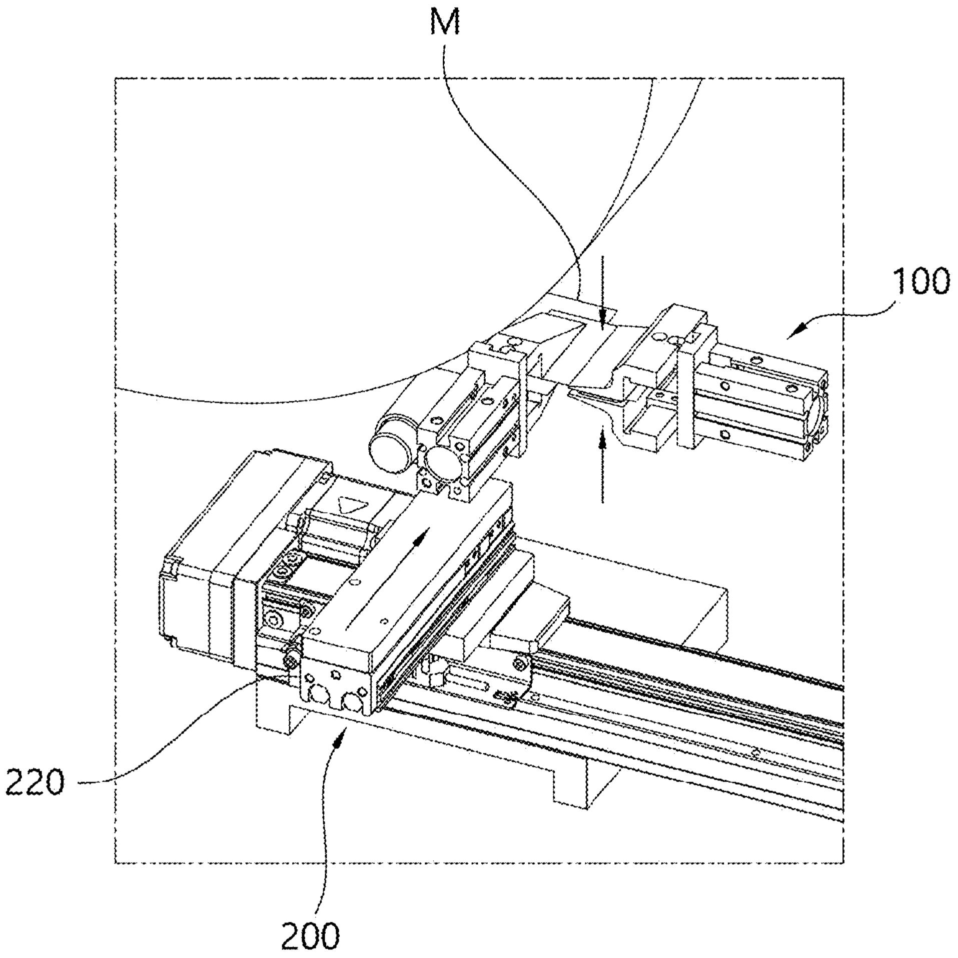
FIGS. 7A and 7B are usage state diagrams showing a process in which the first pulling part delivers a material to the second pulling part in an embodiment of the present disclosure.
Figure 7B:
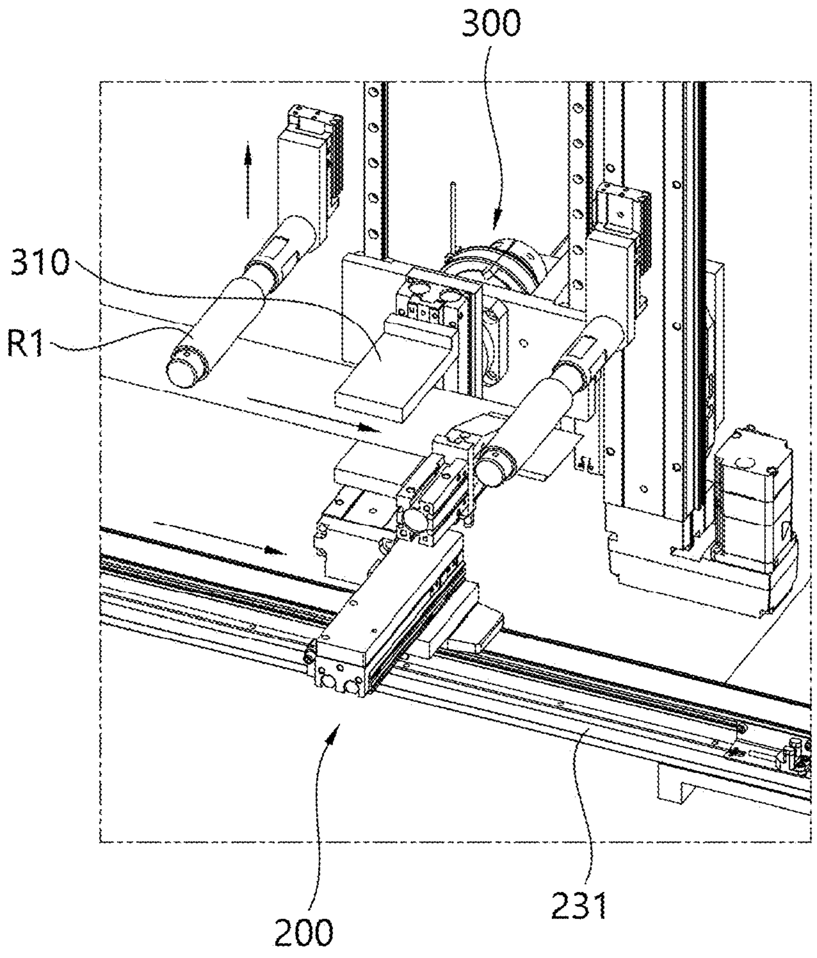

FIGS. 7A and 7B are usage state diagrams showing a process in which the first pulling part 100 delivers the material M to the second pulling part 200 in an embodiment of the present disclosure.

Referring to FIG. 7A, the first pulling part 100 moves more horizontally than the position of the second pulling part 200. Thereafter, the second pulling part 200 moves a predetermined distance pullard the rear while the second clamp 210 is opened. At this time, the material M may be positioned in the second clamp 210.

Referring to FIG. 7B, after the material M is delivered to the second pulling part 200, the first pulling part 100 may release the fixing operation of the first clamp 110 and move to the rear of the frame 10. Therefore, the pulling operation of the second pulling part 200 is not hindered by the first pulling part 100.

Figure 8A:
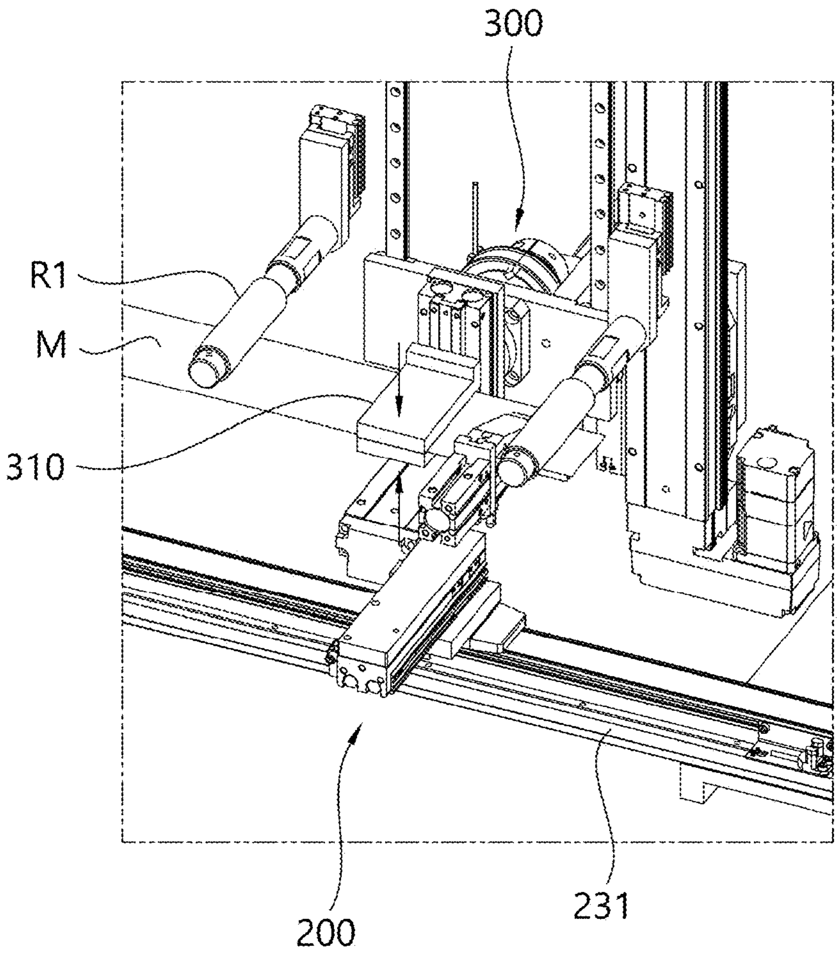
FIGS. 8A and 8B are usage state diagrams showing a process in which the second pulling part transfers a material to the material transfer part in an embodiment of the present disclosure.
Figure 8B:
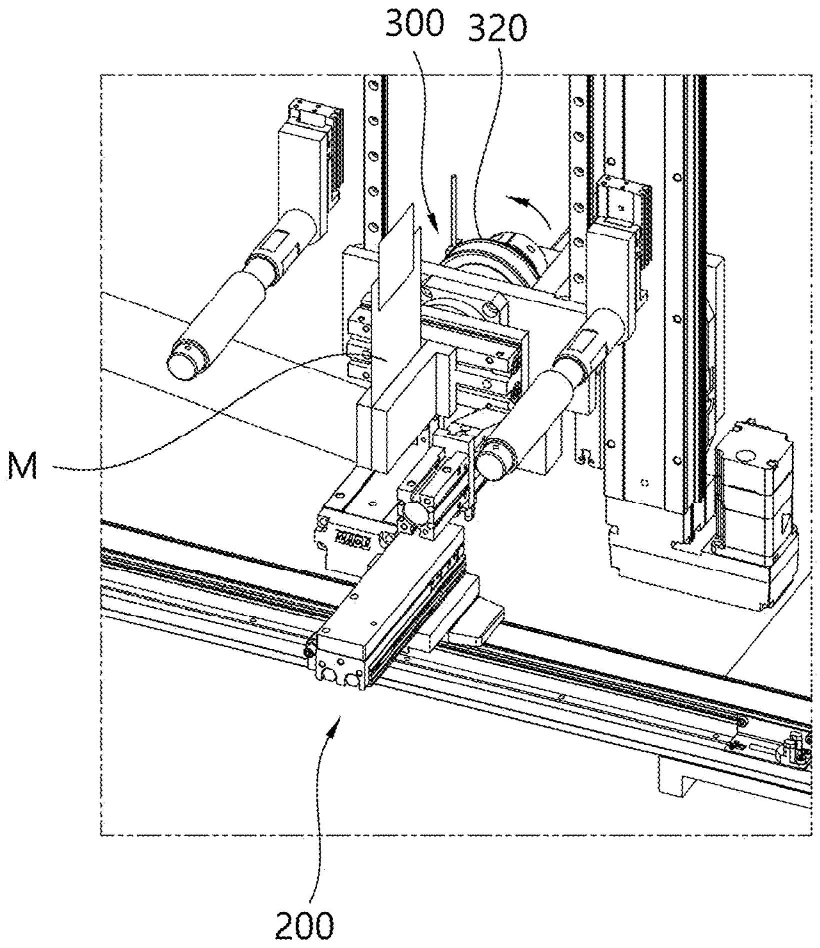

FIGS. 8A and 8B are usage state diagrams showing a process in which the second pulling part 200 delivers the material M to the material transfer part 300 in an embodiment of the present disclosure.

Referring to FIG. 8A, the second pulling part 200 move horizontally to a position that has passed the horizontal position of the material transfer part 300. At this time, the material transfer part 300 is moved backward.

Referring to FIG. 8B, the material transfer part 300 moves forward a predetermined distance so that the material M may be positioned in the third clamp 310. When the second pulling part 200 releases the material M, the material transfer part 300 drives the rotary driving part 320 to rotate the material M 90 degrees.

At this time, the moving guide roller R1 may move downward to support a side of the material M.

Figure 9:
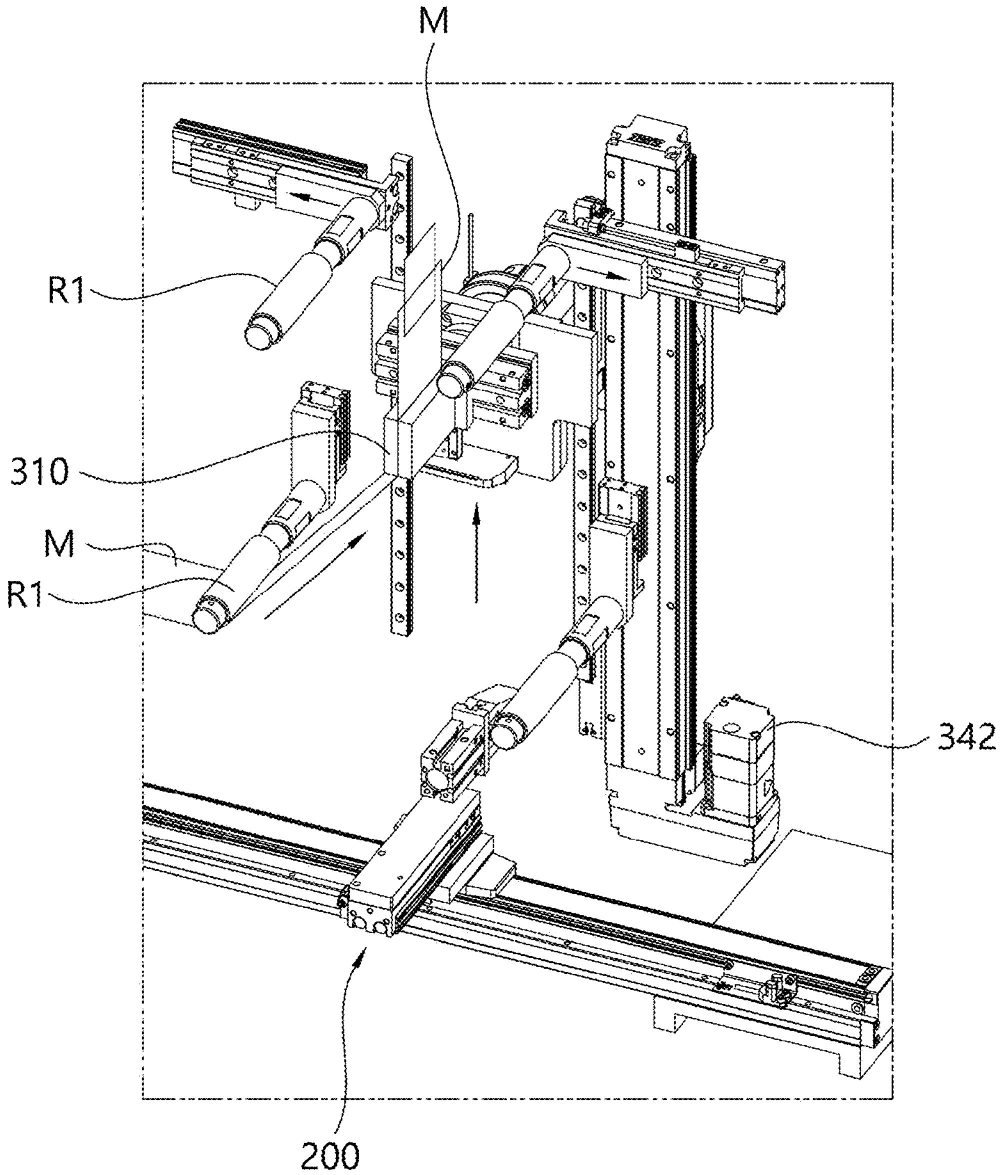
FIG. 9 is a usage state diagram showing the operation of the material transfer part transferring a material to a required position.

FIG. 9 is a usage state diagram showing the operation of the material transfer part transferring a material to a required position.

In the present disclosure, a final position of the material M pulled by the material transfer part 300 may be a material connecting device for connecting to the material M that has been used. Such a material connecting device may be provided on a path from the material supply reel Ro pullard a winding part. Although not shown in the drawing, the material connecting device may be configured to simultaneously cut a new material M that is placed if necessary and a material M that has been used, and to attach tape thereto. At this time, the new material M may be moved by the material transfer part 300 to be immediately connected to the old material M, or may be placed in a predetermined position, wait, and then be connected to the old material M at an appropriate time.

The material transfer part 300 pulls the material M upward. At this time, the material M may be transferred without damage while being supported by the moving guide roller R1. Further, the second pulling part 200 may be returned to its original position with the second clamp 210 moved forward.

Figure 10A:
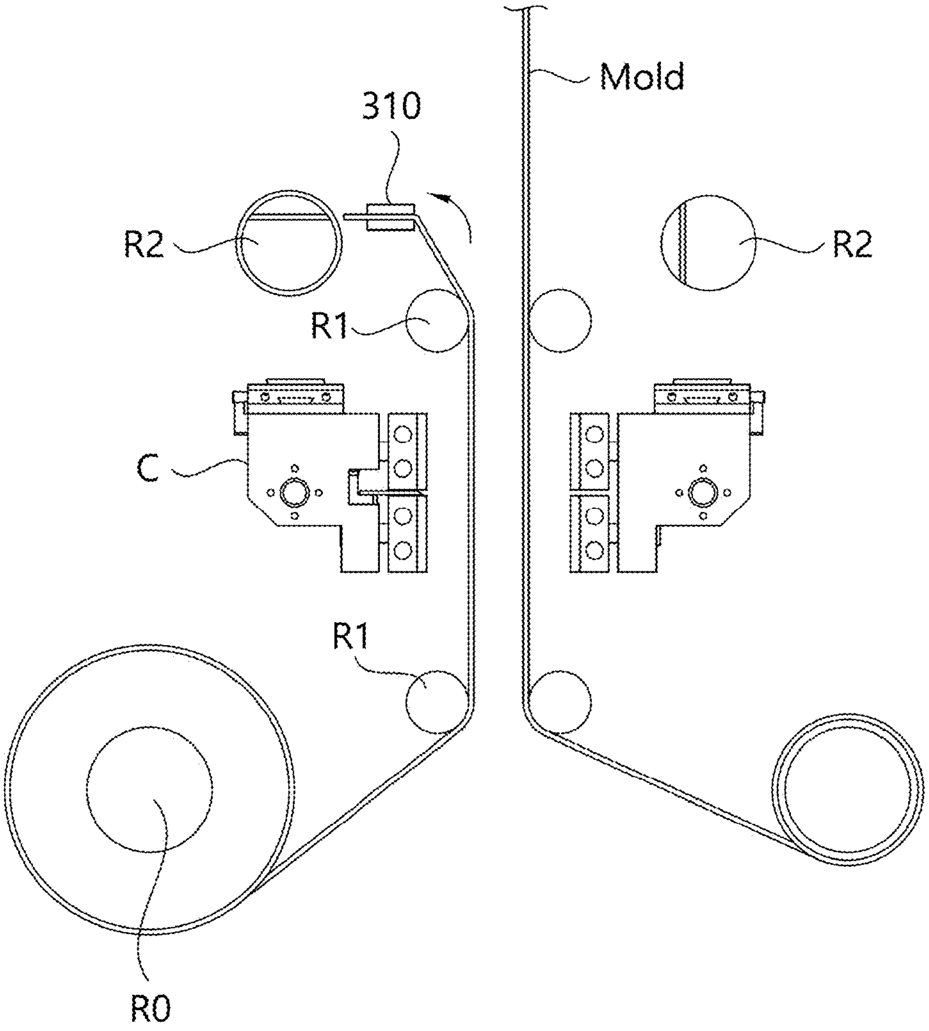
FIGS. 10A, 10B, and 10C are usage state diagrams showing a process of placing a new material with the material transfer part.
Figure 10B:
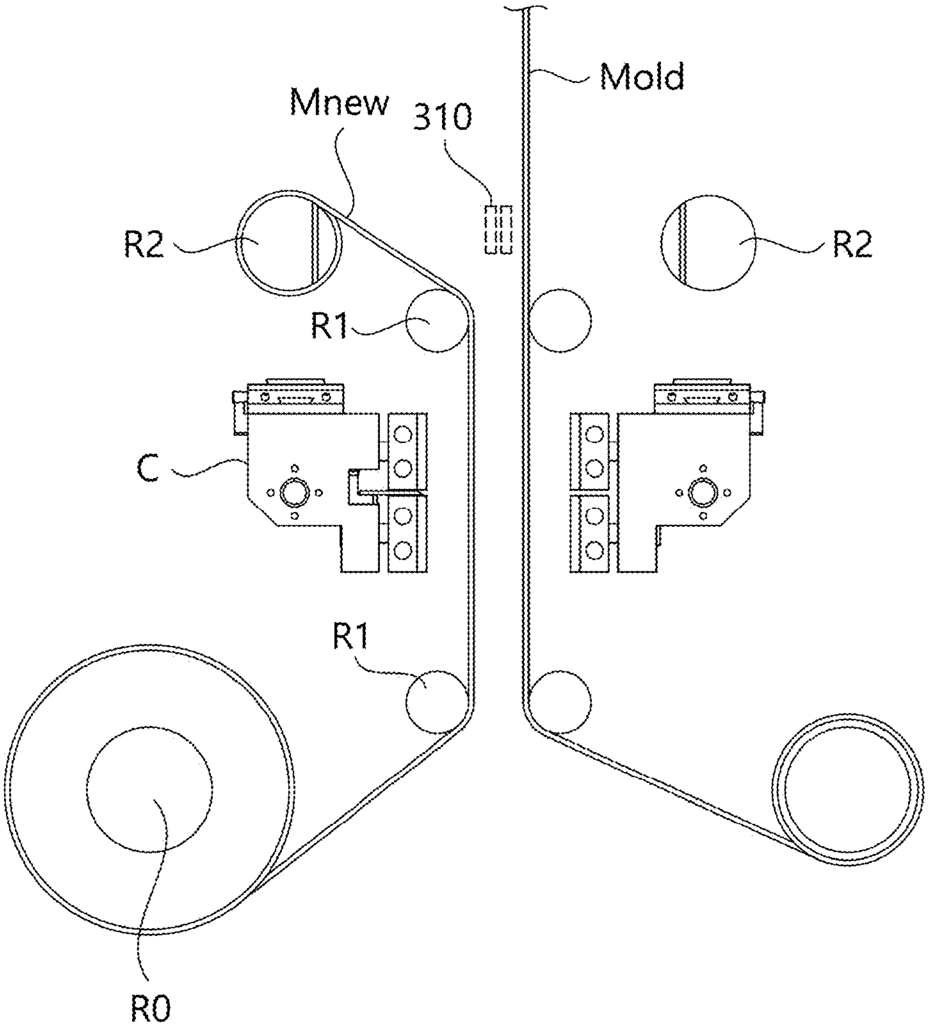
Figure 10C:
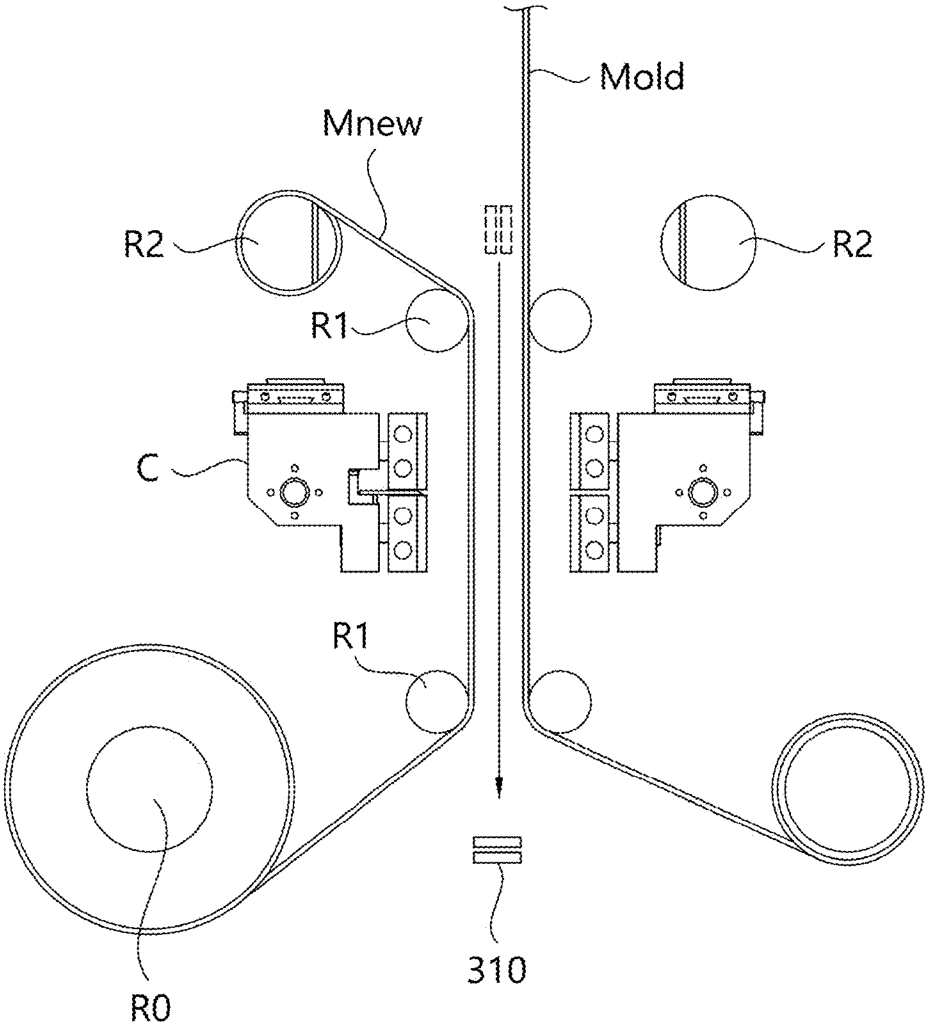

FIGS. 10A, 10B, and 10C are usage state diagrams showing a process of placing the new material M with the material transfer part 300.

Referring to FIG. 10A, the material transfer part 300 may change an angle and move horizontally a predetermined distance so that an end of the new material Mnew may be inserted through a groove of the material fixing roller R2. The material transfer part 300 may further include a third x-axis movement part 350 to move the material Mnew in a horizontal direction. At this time, the old material Mold may be stopped for connection.

Referring to FIG. 10B, when the new material Mnew is inserted into the groove of the material fixing roller R2, the material transfer part 300 releases the material Mnew and moves backward (dash line). At this time, the material fixing roller R2 may wind and fix the material Mnew.

Referring to FIG. 10C, the material transfer part 300 moves downward while the third clamp 310 is moved backward. The material transfer part 300 may have the direction of the third clamp 310 returned to its original position so that it may be used when supplying the next material. Meanwhile, when the use of the old material M is completed, an old material roll may be removed and then a new material roll may be placed on the material supply reel on the right side of FIG. 10C. Thereafter, the pulling operation for supplying a new material may be performed from the material supply reel Ro on the right side of FIG. 10C.

As described above, an automatic material supply device for a secondary battery according to the present disclosure can automatically transfer a new material to the material connecting position and wait for it.

Therefore, since it is possible to continuously supply a material and shorten time required for material replacement, the efficiency of manufacturing a secondary battery can be maximized.

What is claimed is:

1. An automatic material supply device for a secondary battery, the device comprising:

a material supply reel configured to enable a wound material for the secondary battery to be loaded;

a material pulling part configured to pick up an end of a newly wound material for the secondary battery loaded on the material supply reel, and configured to pull the material a predetermined distance; and a material transfer part configured to hold a side of the material pulled out by the material pulling part, and configured to pull the material to a material connector, wherein the material pulling part comprises:

a first pulling part configured to hold and move an outer excess of the wound material for the secondary battery; and a second pulling part configured to hold a portion of the material pulled out by the first pulling part and transfer it to the material transfer part, wherein the first pulling part comprises a first interference avoidance part configured to cause the first pulling part to be removed from a transfer path of the material when the second pulling part holds the material.

2. The automatic material supply device of claim 1, wherein the second pulling part further comprises a second interference avoidance part configured to cause the second pulling part to be removed from the transfer path of the material after the material is delivered to the material transfer part.

3. The automatic material supply device of claim 2, wherein each of the first interference avoidance part and the second interference avoidance part is configured to be movable in a direction orthogonal to a transfer direction of the material.

4. The automatic material supply device of claim 3, wherein the material pulling part further comprises:

a first horizontal movement part configured to reciprocate the first pulling part along a first distance; and a second horizontal movement part configured to reciprocate the second pulling part along a second distance.

5. The automatic material supply device of claim 4, wherein the second distance is determined to be longer than the first distance.

6. The automatic material supply device of claim 3, wherein the material transfer part comprises a rotary driving part configured to change a direction of the material received from the second pulling part.

7. The automatic material supply device of claim 6, wherein the material transfer part further comprises a third interference avoidance part that delivers the material to the material connector and then moves it to prevent interference.

8. The automatic material supply device of claim 7, wherein the material supply reel and the first pulling part each are configured as a pair, and are symmetrically provided around the material transfer part.

9. The automatic material supply device of claim 8, wherein the material transfer part is configured to transfer the material above a height at which a previous material is fixed to the material connector.

10. The automatic material supply device of claim 9, further comprising:

a frame formed to extend in a vertical direction and configured so that the material supply reel, the material pulling part, the material transfer part, and the material connector are fixed.

11. The automatic material supply device of claim 10, wherein the material supply reel, the material pulling part, the material transfer part, and the material connector are configured to transfer the material from a front of the frame.

12. The automatic material supply device of claim 11, wherein the first interference avoidance part, the second interference avoidance part, and the third interference avoidance part are configured to be movable to the front or rear of the frame.

* * * * *